(12) United States Patent
Schmidt

(10) Patent No.: US 6,970,558 B1
(45) Date of Patent: Nov. 29, 2005

(54) METHOD AND DEVICE FOR SUPPRESSING NOISE IN TELEPHONE DEVICES

(75) Inventor: Gerhard Schmidt, Dreieich (DE)

(73) Assignee: Infineon Technologies AG, München (DE)

( * ) Notice: Subject to any disclaimer, the term of this patent is extended or adjusted under 35 U.S.C. 154(b) by 0 days.

(21) Appl. No.: 09/914,281

(22) PCT Filed: Feb. 1, 2000

(86) PCT No.: PCT/DE00/00297

§ 371 (c)(1),
(2), (4) Date: Nov. 8, 2001

(87) PCT Pub. No.: WO00/52917

PCT Pub. Date: Sep. 8, 2000

(30) Foreign Application Priority Data

Feb. 26, 1999   (DE) ................. 199 08 478

(51) Int. Cl.$^7$ ............................................. H04M 9/08
(52) U.S. Cl. ........................... 379/406.01; 379/406.03; 379/406.05; 379/406.06; 379/406.09; 379/406.08
(58) Field of Search ....................... 379/406.01–406.16

(56) References Cited

U.S. PATENT DOCUMENTS

| | | | |
|---|---|---|---|
| 5,574,824 A * | 11/1996 | Slyh et al. ................... | 704/226 |
| 5,757,937 A * | 5/1998 | Itoh et al. ................... | 381/94.3 |
| 5,933,495 A * | 8/1999 | Oh ........................ | 379/406.08 |

FOREIGN PATENT DOCUMENTS

EP        0 804 011 A2    10/1997

* cited by examiner

*Primary Examiner*—Sinh Tran
*Assistant Examiner*—Ramnandan Singh
(74) *Attorney, Agent, or Firm*—Jenkins, Wilson & Taylor, P.A.

(57) ABSTRACT

Device and method for noise suppression in telephone equipment, in particular with hands-free equipment, having a level discriminator, an additional filter with a group propagation time of less than 2 ms being inserted into the transmission and receiving paths of the telephone equipment.

23 Claims, 11 Drawing Sheets

$$q(k) \begin{cases} \begin{bmatrix} b_0^{(r)}\left(\frac{k}{r}\right) + \frac{2}{N}\sum_{i=1}^{\frac{N}{2}-1} b_i^{(r)}\left(\frac{k}{r}\right) \cos\left(\frac{2\pi}{N} i \frac{N}{2}\right) + b_{\frac{N}{2}}^{(r)}\left(\frac{k}{r}\right)(-1)^{\frac{N}{2}} \\ b_0^{(r)}\left(\frac{k}{r}\right) + \frac{2}{N}\sum_{i=1}^{\frac{N}{2}-1} b_i^{(r)}\left(\frac{k}{r}\right) \cos\left(\frac{2\pi}{N} i\left(\frac{N}{2}-1\right)\right) + b_{\frac{N}{2}-1}^{(r)}\left(\frac{k}{r}\right)(-1)^{\left(\frac{N}{2}-1\right)} \\ \vdots \\ b_0^{(r)}\left(\frac{k}{r}\right) + \frac{2}{N}\sum_{i=1}^{\frac{N}{2}-1} b_i^{(r)}\left(\frac{k}{r}\right) \cos\left(\frac{2\pi}{N} i\right) - b_1^{(r)}\left(\frac{k}{r}\right) \\ b_0^{(r)}\left(\frac{k}{r}\right) + \frac{2}{N}\sum_{i=1}^{\frac{N}{2}-1} b_i^{(r)}\left(\frac{k}{r}\right) + b_0^{(r)}\left(\frac{k}{r}\right) \\ b_0^{(r)}\left(\frac{k}{r}\right) + \frac{2}{N}\sum_{i=1}^{\frac{N}{2}-1} b_i^{(r)}\left(\frac{k}{r}\right) \cos\left(\frac{2\pi}{N} i\right) - b_1^{(r)}\left(\frac{k}{r}\right) \\ \vdots \\ b_0^{(r)}\left(\frac{k}{r}\right) + \frac{2}{N}\sum_{i=1}^{\frac{N}{2}-1} b_i^{(r)}\left(\frac{k}{r}\right) \cos\left(\frac{2\pi}{N} i\left(\frac{N}{2}-1\right)\right) + b_{\frac{N}{2}-1}^{(r)}\left(\frac{k}{r}\right)(-1)^{\left(\frac{N}{2}-1\right)} \end{bmatrix} & \text{if } k \bmod r \equiv 0 \\ q(k-1) & \text{Otherwise} \end{cases}$$

FIG. 11

METHOD AND DEVICE FOR SUPPRESSING NOISE IN TELEPHONE DEVICES

TECHNICAL FIELD

The present invention relates to a device and a method for noise suppression in telephone equipment.

RELATED ART

In particular, the present invention relates to such a device and such a method for use in telephone equipment having hands-free equipment and having a level discriminator. A method according to the preamble of claim 1 and of claim 11 is disclosed by EP 0 789 476 A2 and EP 0 880 262 A2 "A system for speech enhancement in the context of hands-free radiotelephony with combined noise reduction and acoustic echo cancellation" by P. Scalart and A. Benamar, Speech Communication 20 (1996), pp. 203–214.

EP 0 804 011 A2 discloses a hands-free communications device, additional filters being provided in the transmission path and the receiving path. In the prior art, devices and methods for noise suppression in telephone equipment, in particular with hands-free equipment with a level discriminator, are already known. However, these devices have the disadvantage that the echo suppression means used there are either very sensitive to interfering noise (as a result of interfering noise from the side of the hands-free participant in the call, opposing speech is detected, although the hands-free participant is currently not speaking), on the other hand, devices provided with corresponding noise suppression filters according to the prior art exhibit a considerable propagation-time delay. Although this is permissible in some standards (for example in the case of GSM or video conferencing applications), during normal fixed network operation, the corresponding propagation-time delay is too great.

SUMMARY OF THE INVENTION

It is therefore the object of the present invention of developing such a device and such a method to the effect that secondary noise is suppressed significantly better and, nevertheless, no impermissibly high signal delays are produced.

According to the invention, this object is achieved by an appropriate device as claimed in claim 1 in which an additional filter with an extremely short propagation time is arranged in the transmission path of the telephone equipment.

It is further preferred to arrange such an additional filter with an extremely short propagation time in the receiving path of the telephone equipment as well.

The additional filter or filters should have a group propagation time of <2 ms.

In order to achieve better adaptation to changing interfering noise, according to the invention the additional filter or filters have adjustable coefficients, a control circuit for adjusting the coefficients being provided.

A particularly low signal propagation time may be achieved, according to the invention, by the additional filter or filters operating in the full band, while the control circuit for adjusting the coefficients operates in the subband.

In order to achieve high frequency selectivity because of the powerful low-frequency signal components in speech and, at the same time, to achieve the lowest possible run time for the coefficient adjustment, it is particularly preferred to connect the input signal in the control circuit to a DFT modulated polyphase filter bank to a phase-minimal prototype low-pass filter.

In order to improve secondary noise, it is particularly preferred for the undersampled output signals from the polyphase filter bank to be connected to a short-term power estimation device.

In this case, it is particularly preferred to connect the outputs from the short-term power estimation device which carry the estimated values of the subband powers to a device for estimating the powers of the background noise and to a device for the psycho-acoustic weighting of the distorted subband powers.

In addition, it is preferred to connect the outputs from the device for estimating the powers of the background noise, via a device for the nonlinear emphasis of the noise signals, and the outputs from the device for the psycho-acoustic weighting directly to a device for calculating the subband weighting factors.

In addition, it is preferred to connect the outputs from the device for calculating the subband weighting factors to a device for a modified inverse discrete Fourier transformation, whose output is connected to the coefficient input of the additional filter or filters.

In this case, it is further preferred for at least some of the outputs from the short-term power estimation device to be connected to a device for attenuation equalization, whose output is connected to a control input of the device for calculating the subband weighting factors.

With regard to reducing the signal delay, it is particularly preferred for the additional filter or filters to be short transversal filters, preferably of a very low order of less than 20.

In order to achieve the aforementioned object, the present invention also teaches a generic method as claimed in claim 11 in which the transmitted signal from the telephone equipment is subjected to additional filtering with a very low propagation time.

In this case, it is particularly preferred also to subject the received signal from the telephone equipment to such additional filtering with a very low propagation time.

In view of the requirements on fixed network telephone connections, it is particularly preferred for the group propagation time for the additional filtering to be adjusted to less than 2 ms.

In this case, it is particularly preferred for the filtering to be carried out by means of short transversal filters (FIR filters) whose order is preferably less than 20.

According to the invention, the transversal filters are controlled by adjustable coefficients, which are adjusted in the same way for both transversal filters.

Processing which is particularly quick and effective in terms of computation time may be achieved, according to the invention, by the filtering being carried out in the full band, while the determination of the coefficients is carried out in the subband.

A plurality of different sampling rates are preferably used within the method.

It is particularly preferred to carry out the determination of the coefficients by means of a subband analysis and reverse transformation by means of a modified inverse discrete Fourier transformation equipment is subjected to additional filtering with a very low propagation time.

In this case, it is particularly preferred also to subject the received signal from the telephone equipment to such additional filtering with a very low propagation time.

In view of the requirements on fixed network telephone connections, it is particularly preferred for the group propagation time for the additional filters to be adjusted to less than 2 ms.

In this case, it is particularly preferred for the filtering to be carried out by means of short transversal shelters whose order is preferably less than 20.

According to the invention, the transversal filters are controlled by adjustable coefficients. In this case, it is particularly preferred for the transversal filters to be controlled with adjustable coefficients, which are adjusted in the same way for both transversal filters.

Processing which is particularly quick and effective in terms of computation time can be achieved, according to the invention, by the filtering being carried out in the full-band, while the determination of the coefficients is carried out in the subband.

A plurality of different sampling rates are preferably used within the method.

It is particularly preferred to carry out the determination of the coefficients by means of a subband analysis and reverse transformation by means of a modified inverse discrete Fourier transformation.

In this case, the modified inverse Fourier transformation is preferably applied to the subband filter coefficients.

In this case, it is particularly preferred to implement the subband analysis in frequency subbands by means of a filter bank.

As distinct from previous methods, the present invention has the great advantage that there is only a very low signal delay, and only a relatively low outlay on computation is required for the overall method.

BRIEF DESCRIPTION OF THE DRAWINGS

The present invention will be explained in more detail below using the appended drawings, in which:

FIG. 11 shows the calculation form for the filter coefficients according to the invention.

DETAILED DESCRIPTION OF THE INVENTION

Figure 1:
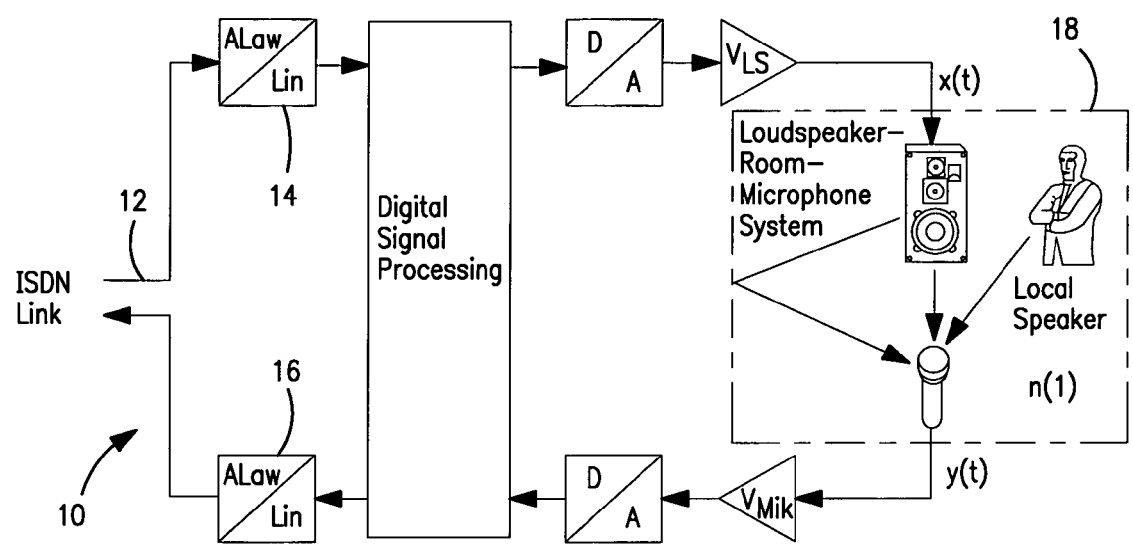
FIG. 1 shows the model of a hands-free device.

FIG. 1 shows a simplified model of a hands-free device 10 with a connection to a digital link 12. The A-law coding and decoding used in the European ISDN network is represented in the two left-hand blocks 14, 16. Sketched on the right-hand side are the loudspeaker room microphone system 18 (LRM system) with the local participant 20 in the call, the user of the hands-free device.

As a result of the acoustic coupling between loudspeaker and microphone, there is cross talk via the LRM system. This cross talk is perceived by the remote participant as a disruptive echo. In this case, acoustic waves emerge from the loudspeaker and are propagated in the room. As a result of reflection at the walls and other objects located in the room, a number of propagation paths are produced, which produce different propagation times of the loudspeaker signal. The echo signal at the microphone therefore comprises the superimposition of a large number of echo components and, possibly, the useful signal n(t): from the local speaker.

Figure 2:
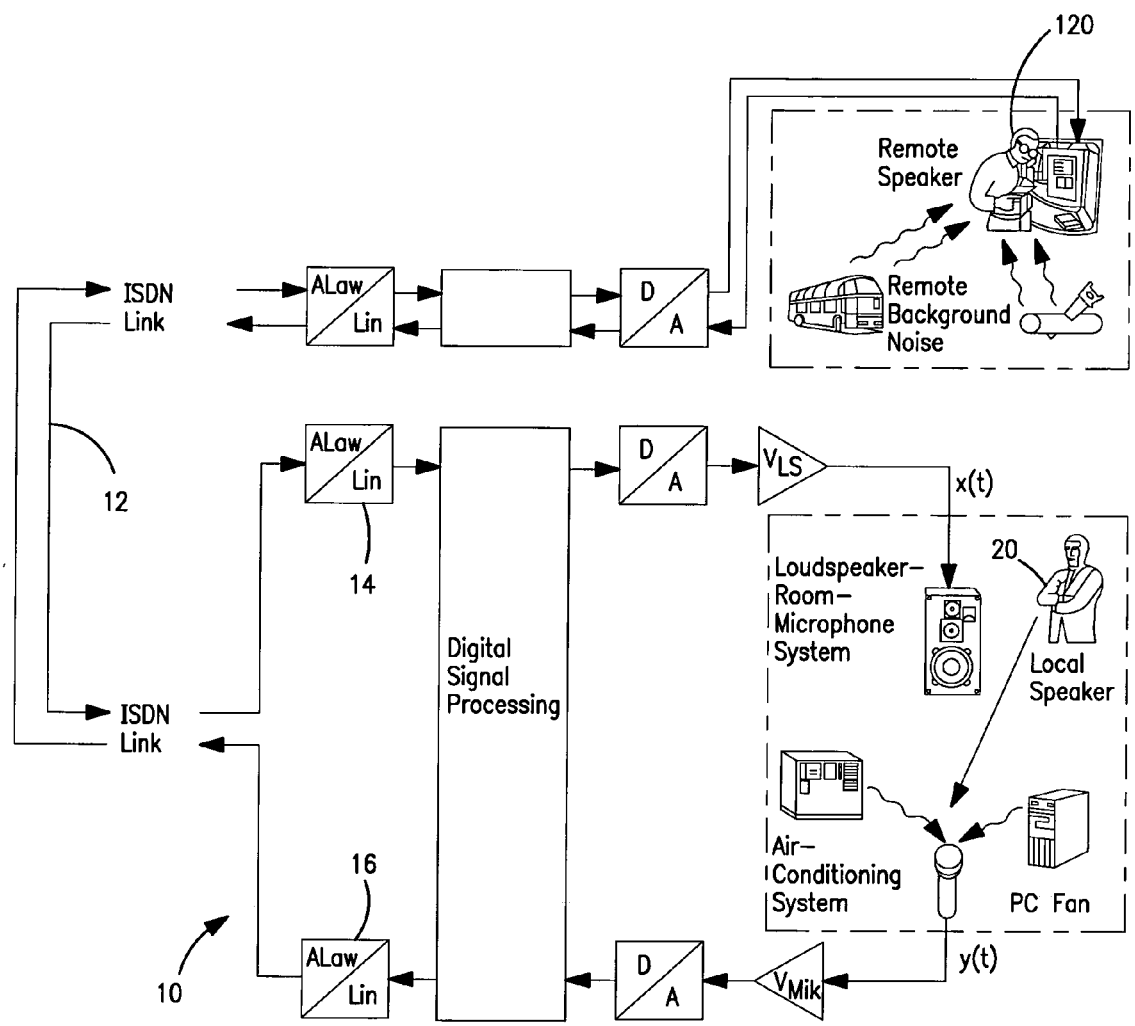
FIG. 2 shows a more extensive representation with the local and remote background noise which arises in each case.

FIG. 2 shows an expanded model of a telephone link. In this case, the previous model (FIG. 1) has been supplemented by the part of the remote participant 120 in the call. The drawing shows an ISDN link 12, a hands-free device 10 being used on the local side. The remote participant is telephoning with a handset. Particular attention has been placed on the respective background noise.

On the side with the hands-free device, not only the speech from the local participant in the call (the actual useful signal), but also echo components from the remote speaker and local background noise has been picked up by the microphone. Examples of such noise sources within offices are PC fans or air-conditioning systems. Both are sketched in the lower part of FIG. 2. If the local speaker uses a hands-free device in motor vehicles (GSM link), then it is possible for wind noise, rolling noise or engine noise to impair the understandability of the speech components in the microphone signal. The object of digital signal processing within the hands-free device should be to improve the speech quality of the signal to be transmitted.

On the remote side, too, interfering background noise can be superimposed on the speech signal of the participant in the call, although this interference is quieter than in the hands-free case, as a result of the design of a handset. Before the signal from the remote speaker 120 is output on the loudspeaker at the local participant 20, an attempt can also be made here to improve the speech quality of this signal. As a result of the link between the production of noise and the suppression of noise—including the encoding and decoding—it is to be expected that this part of noise suppression is more difficult to implement than local noise reduction. In the case of this part of noise suppression, it is possible to select whether the method is placed merely in the control path of the level discriminator (in order to avoid faulty speech detection) or else in the signal path.

Figure 3:
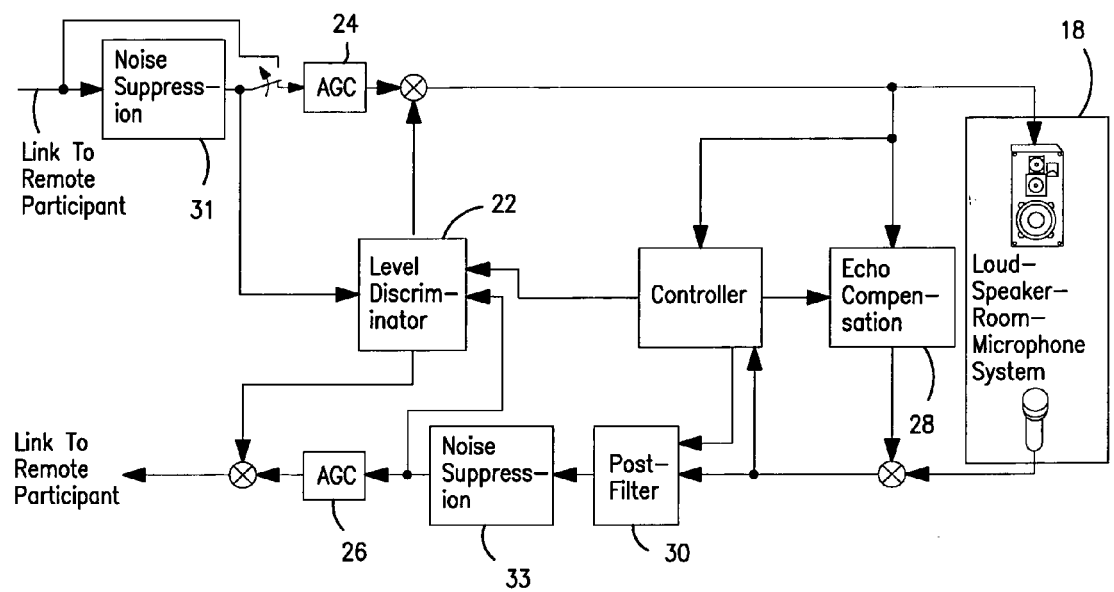
FIG. 3 shows a general representation of a hands-free device according to the invention.

FIG. 3 illustrates a general view of a hands-free device according to the invention. The central element of the method is a level discriminator 22, which is shown in the left-hand part of FIG. 3. Optionally, two gain control systems 24, 26 (automatic gain control = AGC) can be connected into the transmission path and the receiving path. The level discriminator guarantees the minimum attenuations prescribed by the ITU-T recommendations and/or the ETSI recommendations, in that it introduces attenuation into the transmission and/or the receiving path, depending on the call situation. In the event of activity by the remote participant, the receiving path is switched through, and the signal from the remote participant is output on the loudspeaker unattenuated. The echoes produced when compensators are switched off or poorly equalized are reduced considerably by the attenuation inserted into the transmission path. In the event of activity by the local speaker, the situation reverses.

While the receiving path is highly attenuated, the level discriminator 22 does not insert any attenuation into the transmission path, and the signal from the local speaker is transmitted unattenuated. The control of the level discriminator 22 in the case of return speech becomes more difficult. Here, both paths (and therefore also the participants' signals) are each given half the attenuation to be inserted or, in the case of non-optimal control, at least one of the two signal paths is attenuated. Return speech is therefore not possible or only to a restricted extent.

A remedy is provided here by the use of adaptive echo compensators 26—illustrated in the right-hand part of FIG. 3. These attempt to simulate the LRM system digitally, in order then to compute the echo component from the remote participant out of the microphone signal. Depending on how well the compensators manage this, the overall attenuation to be inserted by the level discriminator 22 can be reduced.

Figure 4:
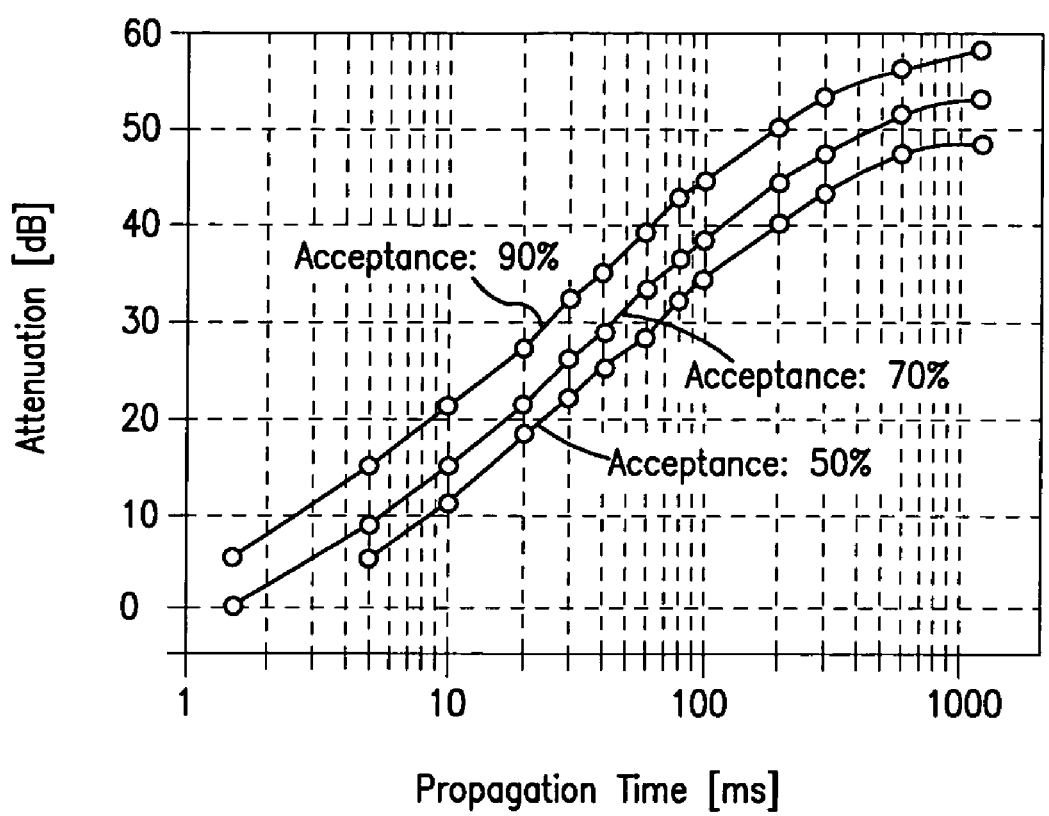
FIG. 4 shows the attenuation requirements as a function of the echo propagation time.

In hands-free devices with noise reduction according to the prior art, the propagation time is mainly determined by the noise-reducing component. FIG. 4 shows the results of a study. An attempt was made here to find what echo attenuation is needed, as a function of the propagation time of this echo, in order that 90, 70 and 50 percent, respectively, of those questioned are satisfied with the quality of the call.

On the basis of this study, the requirements which are placed on hands-free systems with noise suppression methods are higher, because of the greater propagation time, than the requirements on conventional hands-free telephones.

Since the echo compensators are limited in terms of their efficiency and high echo attenuation levels of this type cannot be achieved with the hardware available, a postfilter 30, as it is called, has been inserted. A detailed description relating to this will be found in DE-A-198 06 015.

In order to suppress interfering background noise, two short transversal filters 31, 33 are connected into the transmission path and the receiver path of the hands-free device. The filter 33 in the transmission path is intended to reduce local background noise. Therefore, firstly, the speech quality of the transmitted signal is increased—but secondly, the probability of erroneous opening of the transmission channel by the level discriminator 22 is reduced.

The filter 31 in the receiving path is intended to improve the speech quality of this signal in call situations in which the remote participant's signal is also noisy. The two filters 31, 33 have been designed in such a way that the group propagation time is low and is less than or equal to 2 ms. Should the hands-free device not contain any further delays, it is therefore possible to comply with the ITU-T recommendation G. 167 for fixed telephone networks in relation to propagation time (when using only one noise suppression filter in the signal path). The overall outlay on computation for this method is around less than two MIPS per filter (the basis used was the Siemens SPC signal processor), which permits use even in the simplest signal processors.

In the following text, first of all an overview will be given of the method according to the invention for improving speech. Then, the prior art in relation to single-channel noise suppression methods and the differences from the method according to the invention will be described.

Figure 5:
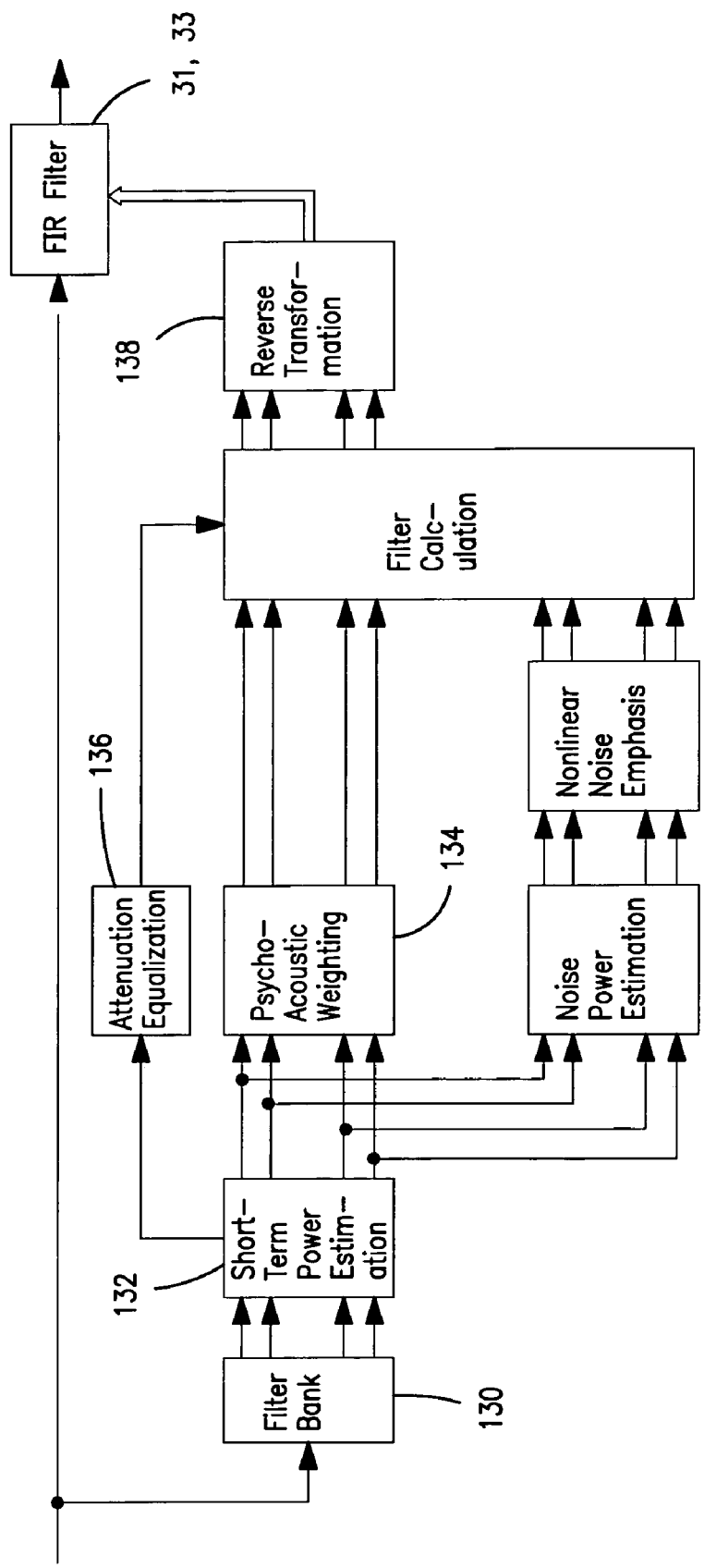
FIG. 5 shows a general representation of noise suppression according to the invention.

The structure of the noise suppression means according to the invention is illustrated in FIG. 5. The two filters 31, 33 (in the transmission and receiving paths) are adjusted by the same algorithm. The actual signal filtering is carried out by a short (at present 16 coefficients long) transversal filter, which is illustrated in the upper part of FIG. 5. At a sampling rate of 8 kHz, this introduces a delay of at most 2 ms into the signal path (given 16 coefficients).

For the adjustment of the filter coefficients, firstly a subband analysis is carried out on the input signal. Here, a DFT modulated polyphase filter bank 130 with a phase-minimal prototype low-pass filter is used. The phase minimality of the prototype low-pass filter guarantees the shortest possible analysis delay—polyphase filter banks can be implemented with a low outlay on computation, even in the simplest signal processors. The output signals from the filter bank are fed, undersampled, to a short-term power estimating means 132. From these estimated values of the subband powers, firstly the powers of the background noise are estimated (lower part of FIG. 5), and secondly psychoacoustic weighting 134 of the disturbed subband powers is carried out. This weighting 134 is intended to keep distortions which arise from the noise suppression as low as possible. The noise estimates are likewise emphasized in a nonlinear manner. This has the purpose of avoiding so-called "musical tones". An exact description of this effect will be found in "P. Vary: Noise suppression by spectral magnitude estimation—mechanism and theoretical limits, Signal Processing 8, pages 387–400, 1985".

From the modified estimates of the total signal powers and the noise powers, the subband weighting factors are determined in accordance with a nonlinear processing means. In this case, an attempt is made to achieve the same loudness of the noisy and the noise-reduced signal. A subroutine 136 with the designation attenuation equalization therefore attempts to find signal components with the greatest possible signal/noise ratio in the time/frequency domain and, on the basis of these signal components, to modify the coefficient adjustment in such a way that the same loudness of the undisturbed and of the disturbed signal is achieved.

The subband weighting factors obtained are transformed back into the time domain by means of a modified inverse DFT 138. In this case, a filter pulse response in the total band is generated. The possibility of back-transformation of the weighted subband signals is dispensed with, because of the necessary phase-maximal synthesis filter bank needed for this purpose and the associated propagation time.

Methods for noise suppression according to the previous prior art may in principle be divided up into three classes:

Methods Based on DFT Decomposition

Here, the input signal is subdivided into blocks, and these are then transformed into the frequency domain by means of a DFT. The actual noise suppression is carried out in the frequency domain. By means of the "over-add principle" or the "overlap-save principle", the blocks are put back together to form a time signal.

Methods Based on Filter-Bank Decomposition

The total band signal is broken down into individual subbands by means of an analysis filter bank. Here, identical filter banks (all the subbands have the same bandwidth) or nonuniform filter banks (unequal bandwidth) can be used. The noise suppression is carried out in the subband domain (band-pass filtered, undersampled time signals). Using a synthesis filter bank, a total band signal is generated again from the subband signals. Methods which are based on wavelet decomposition should also belong to this class, because of the filter bank implementation often used.

Methods Based on Eigenvalue Decomposition

In the case of these methods, an attempt is made to carry out eigenvalue decomposition of the autocorrelation matrix of the input signal. In the case of the eigenvectors which belong to small eigenvalues, it is assumed that they belong to the noise component of the input signal. These are set to zero. Then, the noise-reduced output signal is formed from the modified eigenvectors.

In the case of the subdivision mentioned above, because of the comparison with the method according to the invention, only the single-channel passive methods have been taken into account. As a result of the eigenvalue analysis, noise reductions based on the last-named principle require a great deal of outlay on computation and need long signal propagation times, and will therefore not be treated further here.

For noise reduction methods, high frequency selectivity of the input signal analysis is necessary. The higher-frequency signal components must not be distorted by aliasing in filter banks or by the leakage effect in DFT decomposition. In the case of DFT decomposition, this leads to the use of window functions which achieve adequate attenuation of the secondary maxima. As a result, however, the main forward range is likewise broadened, which in turn leads to large block lengths. There are no methods known which operate with block lengths B of only B=16 at a sampling frequency of $f_{ab}$=8 kHz. The propagation times of previous DFT-based methods are therefore considerably greater than the maximum propagation time prescribed by the ITU of 2 ms in the fixed network area.

The problem of adjacent channel attenuation can be solved by using filter bank structures—however, with the disadvantage of a greater propagation time. Within the analysis/synthesis system, the propagation time can be divided up within certain limits. If, however, the analysis filter bank is designed to be phase-minimal, then this leads to a phase-maximal synthesis filter bank. Even using pure filter bank systems, it is not possible to satisfy the ITU-T requirements for a low fixed network propagation time.

The method according to the invention combines a subband analysis (with the advantages of the low propagation time of phase-minimal analysis filter banks) and backtransformation by means of an inverse DFT. However, the inverse DFT is not applied to the signal but, in a modified form, to the subband filter coefficients. The requirement for high frequency selectivity on account of the powerful low-frequency signal components in speech, and the associated aliasing or leakage effects in the higher-frequency ranges, can be reduced considerably as a result. A more extensive description of this relationship follows further below. The above-described difficulties in the case of low block lengths can therefore be avoided. As a result of this combination, it is possible to achieve noise reduction with a low propagation time and with only little outlay on computing (low number of frequency reference points).

Before a start is made on a more detailed method description, the characteristics of the hands-free method or that part of the method on which the present invention concentrates are listed in tabular form below.

The method is distinguished by the fact that
only very short signal propagation times are inserted into the signal path by the noise suppression,
the actual filtering is carried out in the full-band, but the coefficients for the filter are determined in the subband,
a plurality of different sampling rates are used within the method (multi-rate system),
the frequency analysis is implemented in frequency subbands, by means of a filter bank,
the prototype low-pass filter of the filter bank is designed to be phase-minimal,
a short-term power estimation is carried out by means of nonlinear amplitude smoothing of the subband signals,
psycho-acoustic weighting of the estimated total signal powers is carried out,
nonlinear emphasis of the noise power estimates is carried out,
automatic gain control is used, which weights the filter coefficients in such a way that the noise-reduced signal causes an approximately identical loudness sensation.

The actual signal filtering for noise reduction is carried out by means of a short transversal filter, which is placed in the (total band) signal path. The total band filtering is carried out in accordance with the following calculation rule:

$$y(k) = \underline{g}^T(k) * \underline{x}(k)$$
$$= \sum_{i=0}^{N-1} g_1(k)x(k-i).$$

Here, $\underline{g}(k)$ designates the filter vector of the total band transversal filter $$\underline{g}(k) = (g_o(k), g_1(k), g_2(k), \ldots g_{N-1}(k))^T$$

The vector $\underline{x}(k)$ contains the last N sampled values of the input signal from the noise suppression filter:

$$\underline{x}(k) = (x(k), x(k-1), x(k-2), \ldots x(k-N+1))^T$$

The order N−1 of the transversal filter can be selected to be very low, for example N=16, as compared with previous time domain methods.

For the adjustment of the filter coefficients, subband decomposition is used. The number of frequency reference points in the method presented here should be equal to the number of filter coefficients of the total band filter (N). The attenuation of one filter band channel with respect to the others should be selected to be so great that, in spite of the coupling of the low frequency components as a result of aliasing in the higher frequencies, an average signal aliasing ratio of about 20 dB can be maintained. Here, the value of 20 dB corresponds to the maximum value of the attenuation which the noise suppression may insert.

Figure 6:
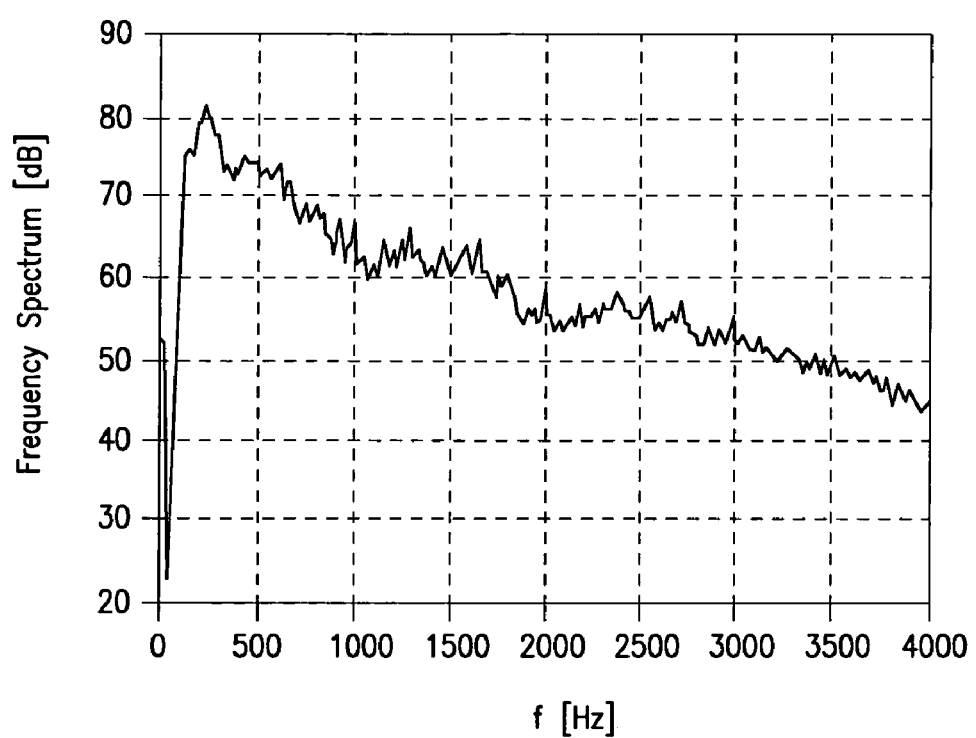
FIG. 6 shows an averaged speech spectrum from a German speaker.

For the purpose of illustration, FIG. 6 shows an averaged speech spectrum. It was determined from eight German speech samples, from respectively four male speakers and four female speakers. The total length of the speech sample was about 50 s. The spectrum was calculated by the squares of the amplitudes of the Fourier transforms from frames of length 1024 being averaged with a Hanning window when weighting. The averaged spectrum is plotted logarithmically against the frequency.

From the averaged speech spectrum it is possible to see that attenuation of about 40 dB is already necessary in order that the low-frequency signal components produce an average signal aliasing ratio of 0 dB in the higher-frequency subbands. Together with the maximum attenuation of the noise suppression, residual channel attenuations of the filter bank of about 60 dB are therefore necessary.

In the selection of the filter bank type, the hardware platform on which the implementation is based plays an important part. Although the predefined attenuation requirements can be achieved with very low filter orders in the case of IIR filter banks, the characteristics of such filter banks are, however, very susceptible to computational inaccuracies in fixed-point signal processors. In most cases, a change must be made from 16×16-bit multiplications, which can be carried out very quickly on consumer processors, to 16-bit×32-bit or even to 32-bit×32-bit multiplications. These last-named multiplication forms need considerably more outlay on computing, however, so that DFT modulated FIR polyphase filter banks are used in the method described here.

The method according to the invention is based on the filter-bank implementation presented in "G. Wackersreuther: Ein Beitrag zum Entwurf digitaler Filterbanke, Nr. 64, Ausgewahlte Arbeiten uber Nachrichtensysteme, Erlangen, 1987" [A Contribution to the Design of Digital Filter Banks, number 64, Selected Studies in Telecommunications Systems]. The subband signals undersampled at the undersampling rate r are determined in accordance with the following calculation rules:

$$x_\mu^{(r)}(n) = \sum_{v=0}^{N-1} e^{j\frac{2\pi}{\mu}v\mu} v_v^{(r)}(n)$$

with $$\mu \in \left\{0, \ldots, \frac{N}{2}\right\}.$$

The superscripted (r) is in this case intended to refer to the undersampling. The subscripted $\mu$ or $v$ in this case selects one of the subband signals from the range 0 ... N−1. Since the complex signals $r_\mu^r(n)$ have been calculated from a real signal x(k), the upper frequency band signals can be determined from the lower subbands by means of complex conjugation. In order to calculate the intermediate signals $v_v^{(r)}(n)$ needed for the calculation rule, first of all the following auxiliary signals are introduced:

$$\tilde{x}^{(N)}(n=)x(nN-p)$$

$$h_p^{(N)}(n)=h_{TP}(nN+p)$$

where n,p is part of Z (set of whole numbers).

In this case, $h_{TP}(k)$ designates the pulse response of the so-called prototype low-pass filter on which the filter bank is based. Using the auxiliary variables $\tilde{x}_p^{(N)}(n$ and $h_p^{(N)}(n$, the calculation of the intermediate signals $v_{84}^{(r)}(n$ can be specified as follows:

$$v_v^{(r)}(n) = \tilde{x}_{v-(m \bmod N)} \left(\frac{m-(m \bmod N)}{N}\right) * h_v^{(N)}\left(\frac{m-(m \bmod N)}{N}\right)$$

$$= \sum_{i=0}^{N_{TP}/N} \tilde{x}_{v-(m \bmod N)}\left(\frac{m-(m \bmod N)}{N} - l\right) h_v^{(N)}(l)$$

Figure 7:
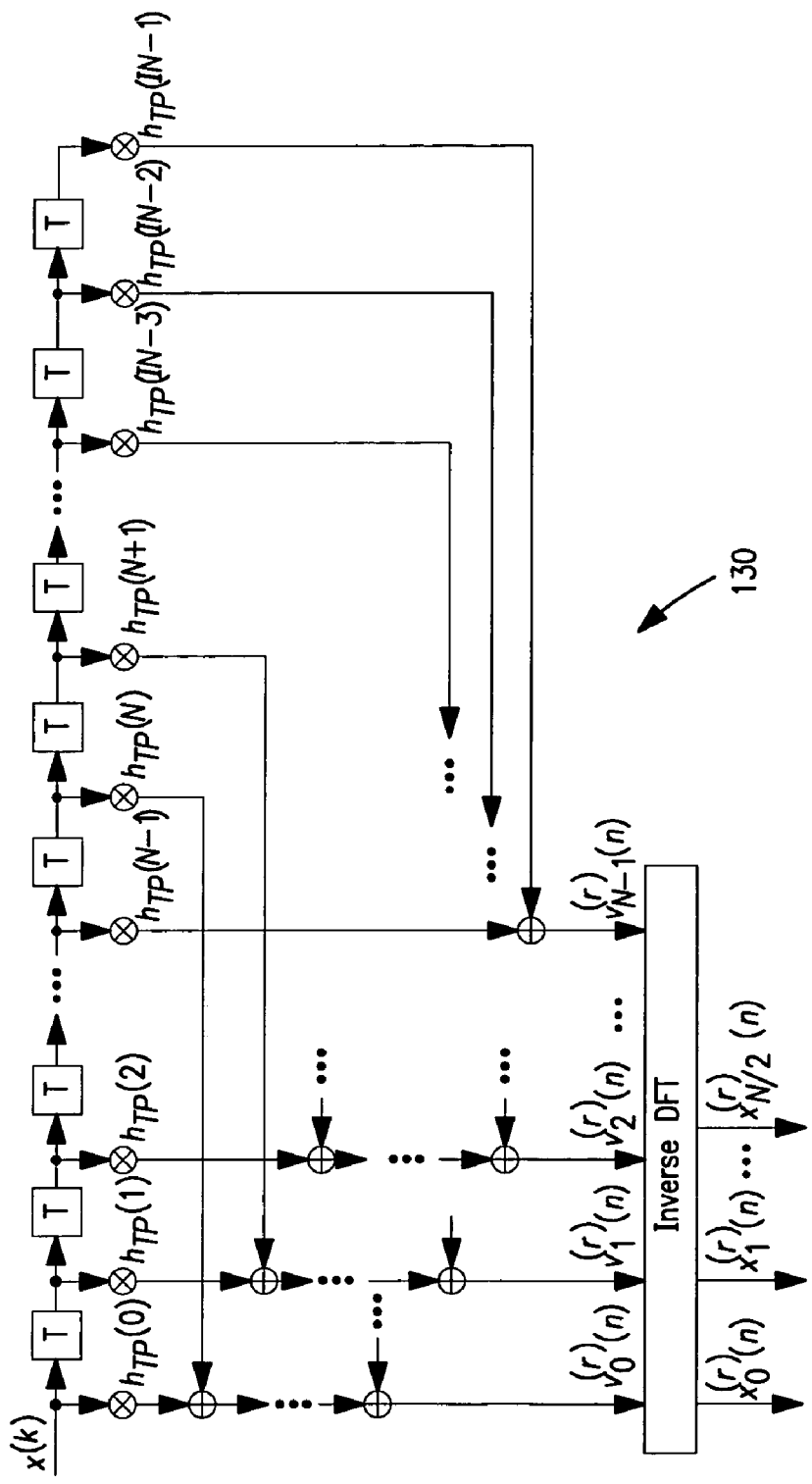
FIG. 7 shows the structure of an analysis filter bank according to the invention.

Here, the order of the prototype low-pass filter is designated by $N_{TP}-1$. FIG. 7 illustrates a structural representation of the filter bank calculation. Only the input memory is filled at the full sampling rate—all further calculations (convolution and inverse DFT) are carried out only with undersampling. The indexing of the auxiliary variables, which initially appears complex, can be carried out efficiently even on simple signal processors, without carrying out each individual division or modular calculation explicitly.

By using the subband signals $x_\mu^{(r)}(n$, by means of nonlinear amplitude smoothing, estimated values of the short-term powers are formed. In this case, the formation of the amplitude is approximated in accordance with the following calculation formula, for reasons of outlay and memory:

$$x_{\mu abs}^{(r)}(n)=|\text{Re}\{x_\mu^{(r)}(n)\}|+|\text{Im}\{x_\mu^{(r)}(n)\}|.$$

The actual short-term estimates are formed by means of nonlinear IIR filters of first order:

$$|\overline{x_\mu^{(r)}(n)}| = \beta_\mu(n) x_{\mu,abs}^{(r)}(n) + (1 - \beta_\mu(n))|\overline{x_\mu^{(r)}(n-1)}|.$$

The time constant $\beta_\mu(n)$ is in this case selected such that a rise in power can be followed quickly and a drop in power can be followed slowly:

$$\beta_\mu(n) = \begin{cases} \beta_r, & \text{if } x_{\mu,abs}^{(r)}(n) > |\overline{x_\mu^{(r)}(n-1)}| \\ \beta_f, & \text{otherwise} \end{cases}$$

By selecting different time constants, the intention is to take account of the psycho-acoustic effect of temporal post-masking. A sudden increase in the signal powers is interpreted by the noise suppression method as the beginning of speech. In such cases, attenuation already introduced is quickly withdrawn. In the event of a sudden drop in the signal powers, the end of a speech segment is assumed. As a result of the temporal masking effect, the human ear is only briefly insensitive to the remaining background noise. The attenuation of the noise reduction can therefore be introduced more slowly than it is withdrawn at the start of the passage of speech.

In addition to temporal masking, the effect of frequency or simultaneous masking can also be utilized to reduce speech distortion. For this purpose, the estimated signal powers are assessed psycho-acoustically.

As opposed to speech coding methods (for example MPEG audio encoding), the starting point here is a very simple psycho-acoustic model. Since in the low frequency ranges, often only poor signal/noise ratios are to be encountered, the search for masking signals is carried out only in the first subband $$\left(\Omega \in \left[\frac{\pi}{N}, \frac{3\pi}{N}\right]\right).$$

. Higher-frequency ranges are not included in the search, for reasons of expenditure. The masking pattern threshold is assumed independently of the masking signal and is approximated by a logarithmic characteristic curve.

For the modified estimates of the short-term subband powers, the result in the lowest subband ($\mu=0$) is therefore:

$$|\overline{\tilde{x}_\mu^{(r)}(n)}| = \text{Max}\{|\overline{x_\mu^{(r)}(n)}|, (\gamma_{usr})^{\mu-1}\gamma_{abs}|\overline{x_l^{(r)}(n)}|\}.$$

For the upper subbands $\mu\in(\{2 \ldots N/2\})$, the result is correspondingly:

$$|\overline{\tilde{x}_0^{(r)}(n)}| = \text{Max}\{|\overline{x_\mu^{(r)}(n)}|, \gamma_{usr}\gamma_{abs}|\overline{x_l^{(r)}(n)}|\}.$$

Figure 8:
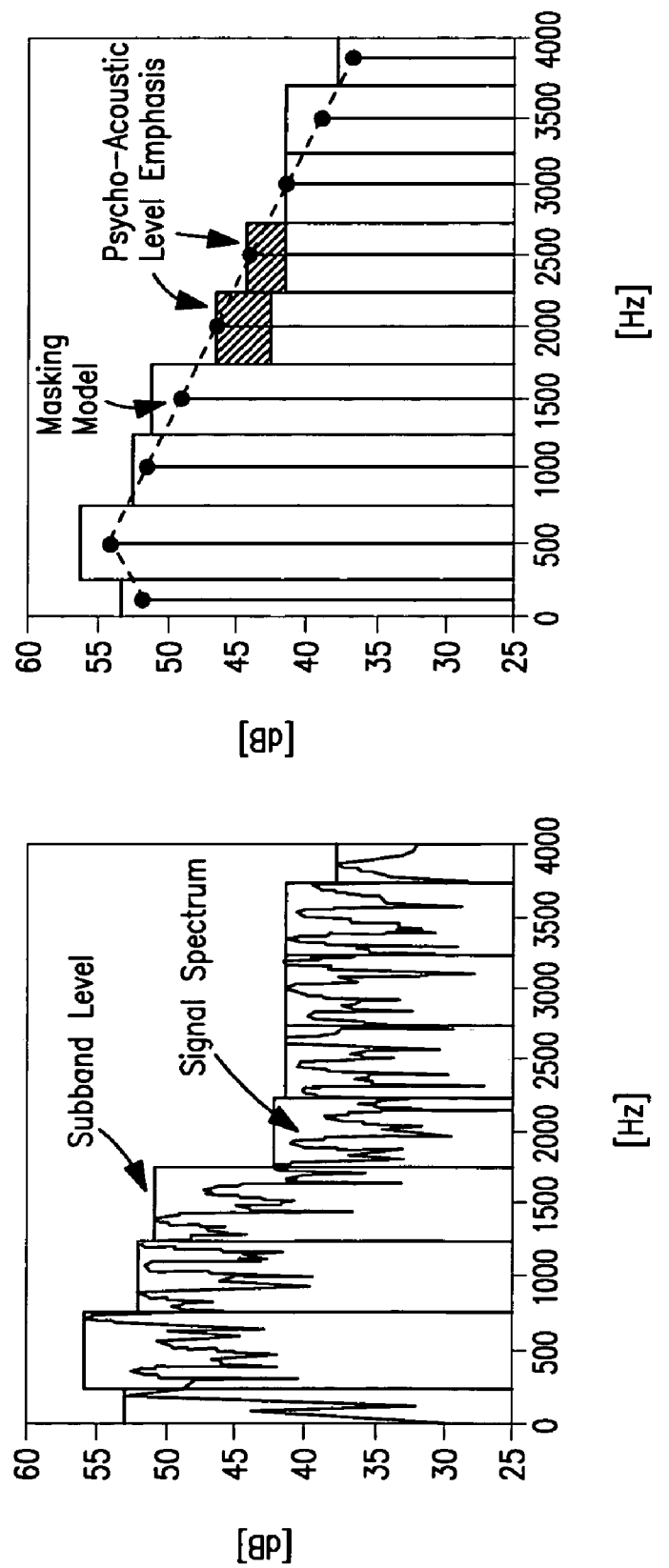
FIG. 8 shows a schematic representation of the psychoacoustic weighting according to the invention.

The psycho-acoustic weighting used is shown schematically once more in FIG. 8. In the left-hand part of the figure, the spectrum of a short section (128 cycles) of a speech signal, and the average subband level (bars) are shown.

Starting from the first subband (250 Hz to 750 Hz at $f_{ab}=8$ kHz and N=16), a masking curve is generated. To this end, the level in the band $\mu=1$ is firstly reduced by the factor $\gamma_{abs}$. Starting from this reference point, the masking pattern thresholds are then approximated by logarithmically falling curves. This is symbolized by the points in the right-hand part of the figure. If the measured subband levels lie below the approximated masking pattern threshold, then artificial emphasis is carried out by forming the maximum.

In order to estimate the background noise powers, a so-called minimum statistic is evaluated. As opposed to most other methods for noise estimation, this method does not need any speech pause detector.

The implemented method for noise power estimation uses estimation windows with a length $N_{MS}$ (r $N_{MS}$) cycles. Within such a window, by means of comparison operations, the minimum of the estimated input power in each subband is determined:

$$\overline{|n_{\mu,abs}^{(r)}(n)|} = \begin{cases} \text{Min}\{|x_\mu^{(r)}(n)|, \overline{|n_{\mu,abs}^{(r)}(n-1)|}\} & \text{if } n \mod N_{MS} \not\equiv 1 \\ |x_\mu^{(r)}(n)|, & \text{otherwise} \end{cases}$$

if n mod $N_{MS} \neq 1$ otherwise

The noise estimation is carried out in several stages, that is to say the minima of the preceding $M_{MS}$ estimation windows are stored. The stored block minima are renewed precisely one undersampling cycle before the renewal condition (n mod $N_{MS}$1) in Equation 2.4 is satisfied. The preceding minima $\overline{|n_{\mu,1}^{(r)}(n)|}$ to $\overline{|n_{\mu,M_{MS}}^{(r)}(n)|}$ are saved in accordance with the following storage rule:

$$\overline{|n_{\mu,M_{MS}}^{(r)}(n)|} = \begin{cases} \overline{|n_{\mu,M_{MS}-1}^{(r)}(n-1)|}, & \text{if } n \mod N_{MS} \equiv 1 \\ \overline{|n_{\mu,M_{MS}}^{(r)}(n-1)|}, & \text{otherwise} \end{cases}$$

if n mod $N_{MS} \neq 1$ otherwise $$\overline{|n_{\mu,2}^{(r)}(n)|} = \begin{cases} \overline{|n_{\mu,abs}^{(r)}(n)|}, & \text{if } n \mod N_{MS} \equiv 1 \\ \overline{|n_{\mu,1}^{(r)}(n-1)|}, & \text{otherwise} \end{cases}$$

if n mod $N_{MS} \neq 1$ otherwise $$\overline{|n_{\mu,1}^{(r)}(n)|} = \begin{cases} \overline{|n_{\mu,abs}^{(r)}(n)|}, & \text{if } n \mod N_{MS} \equiv 1 \\ \overline{|n_{\mu,1}^{(r)}(n-1)|}, & \text{otherwise} \end{cases}$$

if n mod $N_{MS} \neq 1$ otherwise

The actual estimation of the noise power in each subband is carried out by searching for a minimum among the stored block minima and the current block minimum:

$$\overline{|n_{\mu,abs}^{(r)}(n)|} = \begin{cases} \text{Min}\{\overline{|n_{\mu,1}^{(r)}(n)|}, \ldots, \overline{|n_{\mu,M_{MS}}^{(r)}(n)|}\}, & \text{if } n \mod N_{MS} \equiv 1 \\ \text{Min}\{\overline{|n_{\mu,abs}^{(r)}(n)|}, \overline{|n_{\mu,abs}^{(r)}(n-1)|}\}, & \text{otherwise} \end{cases}$$

if n mod $N_{MS} \neq 1$ otherwise

Figure 9:
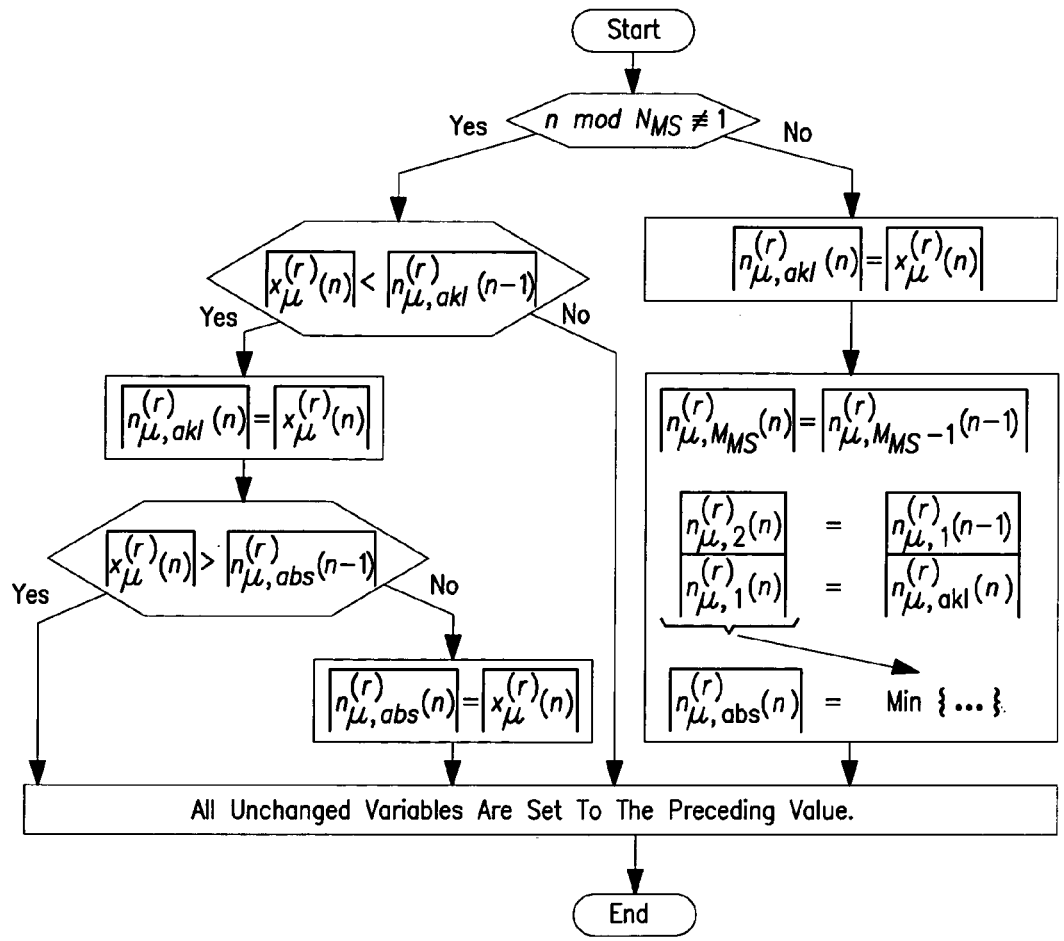
FIG. 9 shows a calculation structure according to the invention for the noise power estimation in a subband.

By means of this form of minimum search, the expenditure on computation can be kept at a minimum. For each undersampling and subband, initially only two comparisons have to be carried out. The variables $$\overline{|n_{\mu,abs}^{(r)}(n)|}$$

and $$\overline{|n_{\mu,abs}^{(r)}(n)|}$$

are updated hereby. Only when $N_{MS}$ new signal values have been encountered does further updating take place. The preceding block minima are only "shifted onward", and the current block minimum is copied into the first delay memory. The structure of the calculation is illustrated in FIG. 9.

The "memory" of the noise power estimation presented here varies with time—the minimum memory relates to (r $N_{MS}$ $M_{MS}$) total band cycles, and at most access can be made back to the preceding (r $N_{MS}$ ($M_{MS}$+1)) total band cycles. The average memory duration of (r $N_{MS}$ ($M_{MS}$+½)) should be selected to be so great that at least one speech pause is contained with high probability. On the other hand, the memory must not be selected to be too large, since otherwise a rise in the noise power can be followed only with a delay. Time periods from 3 to 5 seconds have proven to be acceptable here.

Should the previous estimated values for the total signal powers and the noise powers be used to adjust a noise reduction filter according to a Wiener approach in the frequency domain, then the different "inertias" of the estimates lead to audible artifacts. In passages without any speech activity, the total power estimates follow the short-term fluctuations of the noise levels relatively quickly—the noise estimates detect only the minima and are therefore approximately constant. Although the resulting attenuation is relatively high in those passages, the level fluctuations in the total signal estimators lead to slight fluctuations in the attenuation factors. At the output from the noise reduction means, this can be heard as so-called "musical tones".

Previously known methods for improving speech use smoothing of the total signal levels in the frequency direction in order to avoid these artifacts. In this case, use is mostly made of IIR filters of first order with low smoothing constants or nonlinear median filters of low order.

In the method described here, a different route is followed—it is not the total signal levels but the noise signal estimates which are changed in a further method stage.

First of all, logarithms are taken of the noise power estimates. For this purpose, use is made of a specific hardware logarithm-forming means, which is described in "A. Hauenstein: Implementierung eines Freisprech—algorithmus auf dem Siemens DSP Core SPC, Diplomarbeit D 103, Darmstadt, 1995" [Implementing a hand-free algorithm on the Siemens DSP-core SPC, Thesis D 103]. In the following text, this function is abbreviated by LOG ( . . . ), and it is approximately true that:

$$LOG(x) \approx K \log_{10}|x|.$$

The nonlinear noise level emphasis is carried out as follows:

$$LOG(|\bar{n}_\mu^{(r)}(n)|) = LOG(|n_{\mu,abs}^{(r)}(n)|) + \Delta_{LOG}^{(r)}(n) \text{ where } \mu \in \left\{0, \ldots, \frac{N}{2}\right\}.$$

The level emphasis $\Delta_{LOG}^{(r)}(n)$ is used to the same extent in all subbands. As soon as speech activity is determined in the noisy total signal, the level emphasis is reduced quickly. If no speech activity is detected, the variable $\Delta_{n\,LOG}(n$ (is emphasized slowly. The level emphasis is limited both by a maximum value and by a minimum value:

$$\Delta_{LOG}^{(r)}(n) = \begin{cases} \text{Min}\{\Delta_{Max},(\Delta_{LOG}^{(r)}(n-1)+\Delta_{ink})\}, & \text{if } \overline{|x_2^{(r)}(n)|} < K_\Delta \overline{|x_{2,abs}^{(r)}(n)|} \\ \text{Max}\{\Delta_{Min},(\Delta_{LOG}^{(r)}(n-1)-\Delta_{dek})\}, & \text{otherwise.} \end{cases}$$

As a result of the additive tracking of the level emphasis, short-term erroneous detections of the speech activity detection can be tolerated. For the level increment $\Delta_{INK}$ or for the level decrement $\Delta_{DEK}$, the following is true:

$$\Delta_{ink} < \Delta_{dek}.$$

For the two limiting values $\Delta_{Min}$ and $\Delta_{Max}$, the following settings have been tried and tested:

$$\Delta_{Min} \approx 5 \text{ dB},$$

$$\Delta_{Max} \approx 20 \text{ dB}.$$

The lower limit of about 5 dB balances out again the systematic error which arises as a result of the determination of the minimum of the noise estimation.

This correction depends primarily on the time constants of the IIR smoothing filters—in the event of changes in the time constants, the lower limit should be readapted. The decision as to whether speech activity is detected depends on the selection of the constant $K_A$. In this case, total signal power should lie at least about 15 dB above the estimated noise power, in order to trigger the reduction in the level emphasis. For the constant $K_A$, it is therefore true that:

$$K_\Delta \approx 5.$$

For the reduction in the background noise, first of all the suppression factors in each subband $b_\mu r)_{(n}$ are determined. For this purpose, the procedure follows a configured Wiener approach.

The method presented here uses the following characteristic curve to determine the subband factors:

$$b_\mu^{(r)}(n) = \text{Max}\{b_{Min}, [\alpha_{Dek}^{(r)}(n)(1-\text{LIN}\{b_{\mu,LOG}^{(r)}(n)\})]\}$$

The calculated attenuation factors are limited to a linear minimum value $b_{Min}$. If the limiting values are selected to be too small, the speech distortion increases. In addition, the remote participant in the call loses the impression of the acoustic environment. A limit of about 20 dB has been shown to be a beneficial value here. Using this, it is possible to achieve an improvement in speech without obtaining excessively high speech distortion. In addition, the acoustic background information is maintained (for example the participant is in a motor vehicle), without the residual noise that is present having a detrimental effect on the conversation.

The calculation of the actual suppression factors is carried out with logarithmic variables. Before the limitation, these values have to be transferred into the linear domain again. This is done in a similar way to taking logarithms, using an approximation form which is explained in "A. Hauenstein: Implementierung eines Freisprechalgorithmus auf dem Siemens DSP-Core SPC, Diplomarbeit D 103, Darmstadt, 1995" [Implementing a speech-free algorithm on the Siemens DSP core SPC, Thesis D 103]:

$$LIN(x) \approx 10^{x/K}.$$

Here, the constant K is the same as when taking logarithms. Before limiting the auxiliary variables, an attenuation equalization $\alpha_{DA}^{(r)}(n$ is multiplied in. The determination of this variable is described further below. This is intended to achieve an approximately equal loudness sensation for the noise-reduced and the noise-filled signal.

The logarithmic variables $b_{\mu,LOG}(n)$ are determined as follows:

$$b_{o,LOG}^{(r)}(n) = \{0, \beta_{us,0}[LOG(|\bar{n}_0^{(r)}(n)|) - LOG(|\bar{x}_0^{(r)}(n)|)]\},$$

$$b_{v,LOG}^{(r)}(n) = \{0, \beta_{us,1}[LOG(|\bar{n}_v^{(r)}(n)|) - LOG(|\bar{x}_v^{(r)}(n)|)]\},$$

where $$v \in \left\{0, \ldots, \frac{N}{2}\right\}.$$

By means of the so-called overestimation factors $\beta_{us,0}$ and $\beta_{us,1}$, the "aggressiveness" of the noise suppression can be influenced. Should these factors be selected to be greater than 1, the level difference between the total signal level and the noise signal estimate is artificially increased, and more attenuation is inserted. Since most vehicle noises in low frequency ranges lead to a very poor signal/noise ratio, the overestimation setting in the lowest subband (0 Hz to 250 Hz with N=16 and $f_{aD}$=8 kHz) should be selected separately from the remaining subbands. The limitation prevents the final factors $b_\mu^{(r)}(n)$ being able to assume a value greater than one.

Figure 10:
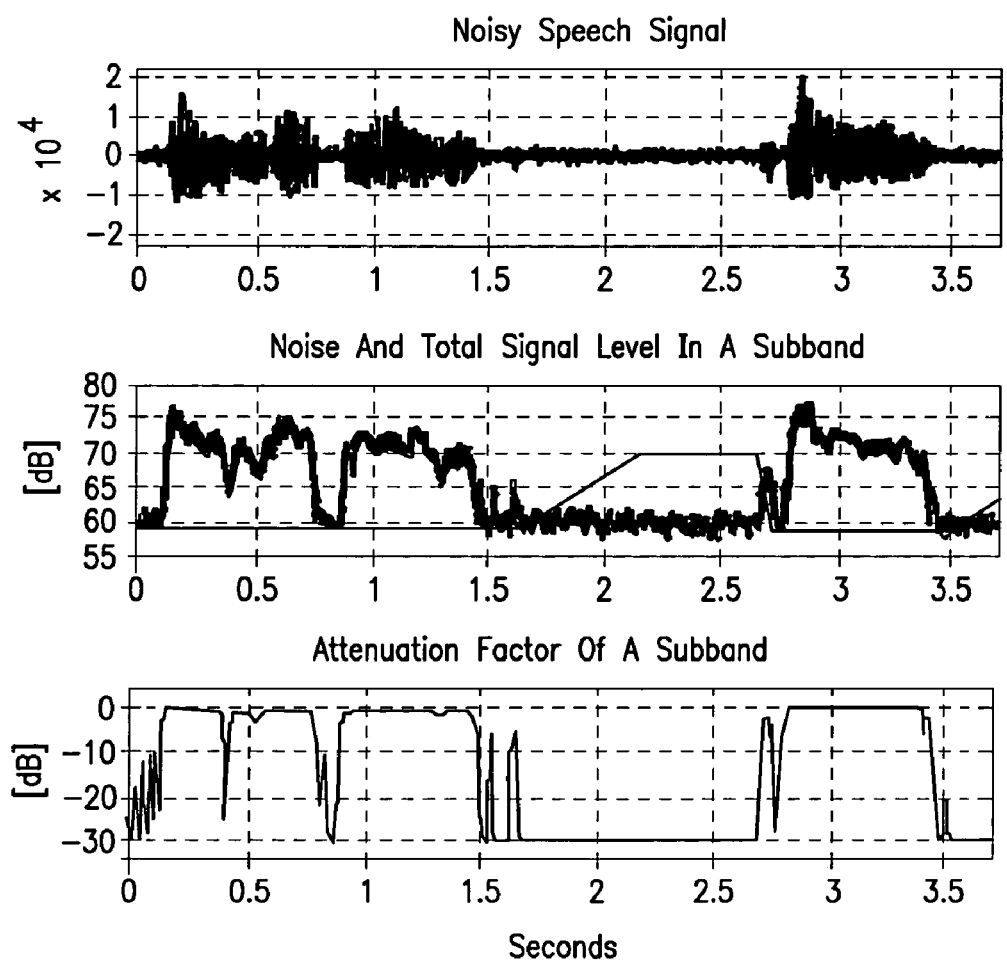
FIG. 10 shows the exemplary waveform of subband attenuation according to the invention.

An example of a waveform for the attenuation in a subband is sketched in FIG. 10. Starting from the noisy total band signal, which is shown in the upper part of FIG. 10, first of all the estimated and assessed short-term powers of the total signal $$\mathrm{LOG}(|\overline{x_\mu^{(r)}(n)}|)$$

and of the noise $$\mathrm{LOG}(|\overline{\tilde{x}_\mu^{(r)}(n)}|)$$

are shown (central part of the figure). The nonlinear noise level emphasis can clearly be seen in the range from 1.5 seconds to 2.7 seconds. At the start of the speech signal, the noise emphasis was not activated. The attenuation fluctuations (musical tones) resulting from this can be seen clearly in the lower part of the figure in the range from 0 seconds to 0.15 seconds. The noise reduction was limited to a maximum attenuation value of 30 dB.

By means of the following part of the method, an attempt is made to influence the subband attenuation factors in such a way that an identical loudness sensation is brought about by the noise-filled and the noise-reduced signal. In this case, the starting point is that the disturbed speech signal has at least short time and frequency sections with a higher useful signal level than the background noise. In order to keep the requisite outlay on computing low, a search is made for powerful signal components only in the second subband. Should the short-term power in this subband lie some decibels above the estimated background noise level, then initially an attenuation factor without any bias compensation $b_{2.DA}^{(r)}(n)$ is determined. This is then inverted and fed to recursive smoothing:

$$\overline{a_{DA}^{(r)}(n)} = \begin{cases} (1-\beta_{DA})\frac{1}{b_{2.DA}^{(r)}(n)} + \overline{\beta_{DA}a_{DA}^{(r)}(n-1)}, & \text{if } |\overline{x_2^{(r)}(n)}| > K_{DA}|\overline{n_2^{(r)}(n)}|, \\ \overline{a_{DA}^{(r)}(n-1)}, & \text{otherwise} \end{cases}$$

where $0 \leq \beta_{DA} \leq 1$.

The temporary subband attenuation factor is determined as follows:

$$b_{1.DA}^{(r)}(n) = \mathrm{Max}\{b_{Max.}[(1-\mathrm{LIN}\{b_{2.LOG}^{(r)}(n)\})]\}$$

where $$b_{2.LOG}^{(r)}(n) = \mathrm{Min}\{0, \beta_{us,1}[\mathrm{LOG}(|\overline{\tilde{n}_2^{(r)}(n)}|) - \mathrm{LOG}(|\overline{\tilde{x}_2^{(r)}(n)}|)]\}.$$

The variable $b_{2.LOG}^{(r)}(n)$ can here be taken as an intermediate result from the subband coefficient determination.

In a last method step, the total band filter coefficients are determined from the subband coefficients previously calculated. The different sampling rates are bridged by simply maintaining the old total band coefficients. Since the subband coefficients change only very slowly, as a result of the IIR smoothing, complicated anti-imaging filtering is dispensed with. The filter coefficients are set in accordance with the calculation form shown in FIG. 11. In this calculation form, the real weighting and the symmetry of the subband coefficients have been used.

What is claimed is:

1. A device for suppressing noise in telephone equipment includes a first adaptive subband filter, the improvement comprising an additional adaptive filter with a short propagation time being arranged in the transmission path of the telephone equipment; wherein the additional adaptive filter includes adjustable coefficients and a control circuit for adjusting the coefficients; and the additional adaptive filter operates in the full band, while the control circuit for adjusting the coefficients operates in the subband.

2. The device as claimed in claim 1, wherein such an additional filter with a short propagation time is also arranged in the receiving path of the telephone equipment.

3. The device as claimed in claim 1, wherein the additional filter or filters have a group propagation time of $\leq 2$ ms.

4. The device as claimed in claim 1, wherein in the control circuit, the input signal is connected to a DFT modulated polyphase filter bank with a phase-minimal prototype low-path filter.

5. The device as claimed in claim 4, wherein the undersampled output signals from the polyphase filter bank are connected to a short-term power estimation device.

6. The device as claimed in claim 5, wherein the outputs from the short-term power estimation device which carry the estimated values of the subband powers are connected to a device for estimating the powers of the background noise and to a device for the psycho-acoustic weighting of the disturbed subband powers.

7. The device as claimed in claim 6, wherein the outputs from the device for estimating the powers of the background noise are connected, via a device for the nonlinear emphasis of the noise signals, and the outputs from the device for psycho-acoustic weighting are connected directly to a device for calculating the subband weighting factors.

8. The device as claimed in claim 7, wherein the outputs from the device for calculating the subband weighting factors are connected to a device for modified inverse discrete Fourier transformation, whose output is connected to the coefficient input of the additional filter or filters.

9. The device as claimed in claim 7, wherein at least some of the outputs from the short-term power estimation device are connected to a device for attenuation equalization, whose output is connected to a control input of the device for calculating the subband weighting factors.

10. The device as claimed in claim 1, wherein the additional filter or filters is or are short transversal filters, preferably of a very low order of $\leq 20$.

11. A method for noise suppression in telephone equipment includes a first adaptive subband filter the method comprising:
   (a) filtering the transmitted signal from the telephone equipment being subject to additional adaptive filtering with a short propagation time;
   (b) wherein the additional full adaptive filtering is controlled by controlling the filtering of step (a) with adjustable coefficients; and
   (c) wherein the filtering is carried out in the full band, while the determination of the coefficients is carried out in the subband.

12. The method as claimed in claim 11, wherein the received signal from the telephone equipment is also subjected to such additional filtering with a very low propagation time.

13. The method as claimed in claim 11, wherein the group propagation time for the additional filtering is adjusted to less than 2 ms.

14. The method as claimed in claim 11, wherein the filtering is carried out by means of short transversal filters whose order is preferably <20.

15. The method as claimed in claim 11, wherein the plurality of different sampling rates are used within the method.

16. The method as claimed in claim 11, wherein the determination of the coefficients is carried out by means of a subband analysis and reverse transformation by means of a modified inverse discrete Fourier transformation (DFT).

17. The method as claimed in claim 16, wherein the modified discrete Fourier transformation is applied to the subband filter coefficients.

18. The method as claimed in claim 16, wherein the subband analysis is implemented in frequency subbands by means of a filter bank.

19. The method as claimed in claim 18, wherein the filter bank is designed as a DFT modulated polyphase filter bank with a phase-minimal prototype low-pass filter.

20. The method as claimed in claim 16, wherein a short-term power estimate by means of nonlinear amplitude smoothing of the subband signals is also made when determining the coefficients.

21. The method as claimed in claim 20, hwerein, during the determination of the coefficients, psycho-acoustic weighting of the estimated total signal powers is additionally carried out.

22. The method as claimed in claim 20, wherein nonlinear emphasis of the noise power estimates is additionally made when determining the coefficients.

23. The method as claimed in claim 20, wherein, when determining the coefficients, automatic gain control is additionally used, which weights the filter coefficients in such a way that the noise-filled and the noise-reduced signal cause an approximately equal loudness sensation.

* * * * *